(12) United States Patent
Tezuka (10) Patent No.: US 11,345,597 B2
(45) Date of Patent: May 31, 2022

(54) PRECURSOR GLASS OF LITHIUM PHOSPHORUS COMPLEX OXIDE AND METHOD OF PRODUCING SAME, METHOD OF PRODUCING PRECURSOR CRYSTALLIZED GLASS OF LITHIUM PHOSPHORUS COMPLEX OXIDE, AND LITHIUM PHOSPHORUS COMPLEX OXIDE POWDER AND METHOD OF PRODUCING SAME

(71) Applicant: Sumita Optical Glass, Inc., Saitama (JP)

(72) Inventor: Tatsuya Tezuka, Saitama (JP)

(73) Assignee: Sumita Optical Glass, Inc., Saitama (JP)

( * ) Notice: Subject to any disclaimer, the term of this patent is extended or adjusted under 35 U.S.C. 154(b) by 310 days.

(21) Appl. No.: 16/622,560

(22) PCT Filed: Dec. 20, 2017

(86) PCT No.: PCT/JP2017/045797
§ 371 (c)(1),
(2) Date: Dec. 13, 2019

(87) PCT Pub. No.: WO2019/038943
PCT Pub. Date: Feb. 28, 2019

(65) Prior Publication Data
US 2020/0369521 A1    Nov. 26, 2020

(30) Foreign Application Priority Data

Aug. 24, 2017 (JP) ............................. JP2017-160744

(51) Int. Cl.
*C01B 25/45* (2006.01)
*C03B 32/02* (2006.01)
(Continued)

(52) U.S. Cl.
CPC .............. *C01B 25/45* (2013.01); *C03B 32/02* (2013.01); *H01M 10/0525* (2013.01);
(Continued)

(58) Field of Classification Search
CPC .. C01B 25/45; C01P 2002/72; C01P 2004/03; C01P 2006/40; C01P 2006/80;
(Continued)

(56) References Cited

U.S. PATENT DOCUMENTS

| 2012/0231349 A1 | 9/2012 | Moon et al. |
| 2014/0220454 A1 | 8/2014 | Furukawa et al. |

FOREIGN PATENT DOCUMENTS

| CN | 102590377 | * | 7/2012 |
| CN | 102590377 A |   | 7/2012 |

(Continued)

OTHER PUBLICATIONS

Kumar, Sundeep et al., "Lithium Ion Transport in Germanophosphate Glasses," Solid State Ionics, vol. 170, 2004, pp. 191-199.*
(Continued)

*Primary Examiner* — Brittany L Raymond
(74) *Attorney, Agent, or Firm* — Kenja IP Law PC (57) ABSTRACT

Provided is a high-quality lithium phosphorus complex oxide powder. The lithium phosphorus complex oxide powder comprises $Li_{1+x}M^{III}_x M^{IV}_{2-x}(PO_4)_3$ ($0 \leq x \leq 1$, $M^{III}$ represents an element selected from Al, Sc, Cr, Fe, Ga, and In, and $M^{IV}$ represents an element selected from Si, Ti, Ge, and Zr) and has a concentration of Zn as an impurity of less than 100 ppm.

7 Claims, 10 Drawing Sheets

Example 1

(51) Int. Cl.
  *H01M 10/0525* (2010.01)
  *H01M 10/0562* (2010.01)

(52) U.S. Cl.
  CPC ..... *H01M 10/0562* (2013.01); *C01P 2002/72* (2013.01); *C01P 2004/03* (2013.01); *C01P 2006/40* (2013.01); *C01P 2006/80* (2013.01); *H01M 2300/0068* (2013.01)

(58) Field of Classification Search
  CPC .. C03B 32/02; C03C 3/17; C03C 3/21; C03C 10/00; C03C 12/00; C03C 15/00; H01B 1/06; H01B 1/08; H01B 13/00; H01M 10/052; H01M 10/0525; H01M 10/0562; H01M 2300/0068; Y02E 60/10
  See application file for complete search history.

(56) References Cited

FOREIGN PATENT DOCUMENTS

| JP | H09142874 A | | 6/1997 |
|---|---|---|---|
| JP | 2008117542 A | | 5/2008 |
| JP | 2013-199386 | * | 10/2013 |
| JP | 2013199386 A | | 10/2013 |
| JP | 2016119276 A | | 6/2016 |
| JP | 2016155057 A | | 9/2016 |
| JP | 2016155707 A | | 9/2016 |
| WO | 2012133566 A1 | | 10/2012 |
| WO | 2017195232 A1 | | 11/2017 |

OTHER PUBLICATIONS

May 11, 2021, Notification of Reasons for Refusal issued by the Japan Patent Office in the corresponding Japanese Patent Application No. 2017-160744.

Aug. 31, 2021, Office Action issued by the China National Intellectual Property Administration in the corresponding Chinese Patent Application No. 201780091955.4.

Junko Ide et al., XAFS study of six-coordinated silicon in $R_2O$—$SiO_2$—$P_2O_5$ (R = Li, Na, K) glasses, Journal of Non-Crystalline Solids, 2007, pp. 1966-1969, vol. 353.

Mar. 20, 2018, International Search Report issued in the International Patent Application No. PCT/JP2017/045797.

Marek Nocuń, Structural studies of phosphate glasses with high ionic conductivity, Journal of Non-Crystalline Solids, 2004, pp. 90-94, vol. 333.

Sundeep Kumar et al., Lithium ion transport in germanophosphate glasses, Solid State Ionics, 2004, pp. 191-199, vol. 170.

Apr. 13, 2021, the Extended European Search Report issued by the European Patent Office in the corresponding European Patent Application No. 17922472.0.

Feb. 25, 2020, International Preliminary Report on Patentability issued in the International Patent Application No. PCT/JP2017/045797.

Sep. 7, 2021, Notification of Reasons for Refusal issued by the Japan Patent Office in the corresponding Japanese Patent Application No. 2017-160744.

* cited by examiner

FIG. 1
Example 1

FIG. 2
Example 2

FIG. 3
Example 3

FIG. 4
Example 4

FIG. 5
Example 5

FIG. 6
Example 6

FIG. 7
Comparative Example 1

FIG. 8
Comparative Example 2

FIG. 9
Comparative Example 3

FIG. 10
Example 1

FIG. 11
Example 2

FIG. 12
Example 3

FIG. 13
Example 4

FIG. 14
Example 5

FIG. 15
Example 6

FIG. 16
Comparative Example 1

FIG. 17
Comparative Example 2

FIG. 18
Comparative Example 3

FIG. 19
Example 1

FIG. 20
Example 4

PRECURSOR GLASS OF LITHIUM PHOSPHORUS COMPLEX OXIDE AND METHOD OF PRODUCING SAME, METHOD OF PRODUCING PRECURSOR CRYSTALLIZED GLASS OF LITHIUM PHOSPHORUS COMPLEX OXIDE, AND LITHIUM PHOSPHORUS COMPLEX OXIDE POWDER AND METHOD OF PRODUCING SAME

TECHNICAL FIELD

The present disclosure relates to a precursor glass of a lithium phosphorus complex oxide, a method of producing this precursor glass of a lithium phosphorus complex oxide, a method of producing a precursor crystallized glass of a lithium phosphorus complex oxide, a lithium phosphorus complex oxide powder, and a method of producing this lithium phosphorus complex oxide powder.

BACKGROUND

Crystals of lithium phosphorus complex oxides are promising candidates for use as solid electrolyte materials in lithium ion secondary batteries due to being chemically stable and displaying high lithium ion conductivity at room temperature. Representative examples of lithium phosphorus complex oxides that can be used as solid electrolyte materials include those represented by $Li_{1+x}Al_xTi_{2-x}(PO_4)_3$ ($0 \leq x \leq 1.0$). Of these lithium phosphorus complex oxides, those for which $x=0$ are referred to as "LTP" and those for which $0 < x \leq 1.0$ are referred to as "LATP".

A lithium phosphorus complex oxide that is to be used as a solid electrolyte material is preferably in a finely powdered form in order to enable use in batteries having a variety of forms and shapes, such as all-solid-state batteries having a high degree of freedom in terms of shape.

Typical methods for producing crystals of a lithium phosphorus complex oxide such as described above include a solid-state method and a sol-gel method. Besides these methods, Patent Literature (PTL) 1 discloses a technique for producing crystals such as described above by melt shaping raw glass containing specific ingredients and subsequently performing heat treatment at a temperature of 800° C. to 1000° C. so as to precipitate $Li_{1+x}(Al,Ga)_xTi_{2-x}(PO_4)_3$ ($x=0$ to 0.8) as a main crystalline phase.

However, in a situation in which crystals of a lithium phosphorus complex oxide are produced by the solid-state method or the sol-gel method, physical milling is also required in order to obtain a fine powder. The implementation of physical milling may lead to problems such as inclusion of contaminants and generation of strain in the crystal structure due to stress. Moreover, high-level techniques and expensive equipment are required to provide the milled product with a sharp particle diameter distribution.

In the technique disclosed in PTL 1, crystals precipitate at the point of glass production due to the glass having low stability against devitrification. These crystals have an extremely large particle diameter compared to crystals that precipitate through subsequent heat treatment. As a result, it is ultimately not possible to obtain crystals that have been finely powdered in a uniform manner.

On the other hand, PTL 2 discloses that by producing a glass using ZnO as an essential component in addition to components that form a lithium phosphorus complex oxide and by subsequently carrying out specific treatment, crystals of LTP or LATP can be obtained in a particulate form.

CITATION LIST

Patent Literature

PTL 1: JP H9-142874 A
PTL 2: JP 2016-155057 A

SUMMARY

Technical Problem

However, although the technique disclosed in PTL 2 makes it possible to obtain crystal particles without milling, a certain amount of a Zn component may dissolve in the crystal particles and remain as an impurity. Therefore, there is also room for improvement of this technique in terms of increasing the quality of the produced particles.

The present disclosure has been conceived in view of the points raised above and has an objective of providing a method for producing a precursor glass with which a high-quality lithium phosphorus complex oxide powder can be obtained, and also to provide this precursor glass. Another objective of the present disclosure is to provide a method of using the aforementioned precursor glass to produce a precursor crystallized glass with which a high-quality lithium phosphorus complex oxide powder can be obtained. Yet another objective of the present disclosure is to provide a method of using the aforementioned precursor crystallized glass to produce a high-quality lithium phosphorus complex oxide powder, and also to provide this lithium phosphorus complex oxide powder.

Solution to Problem

As a result of diligent investigation, the inventor discovered that by using lithium and phosphorus in a specific ratio as an additional material in production of a lithium phosphorus complex oxide, in addition to using a material containing constituent elements of the lithium phosphorus complex oxide, a powdered lithium phosphorus complex oxide of high-quality can ultimately be obtained via a first intermediate product (precursor glass) and a second intermediate product (precursor crystallized glass). In this manner, the inventor completed the present disclosure.

The following describes a solution to the problem set forth above. Specifically, a presently disclosed method of producing a precursor glass of a lithium phosphorus complex oxide comprises melting a material containing constituent elements of a lithium phosphorus complex oxide that is to be produced, together with an additional material containing lithium and phosphorus, wherein a molar ratio of lithium to phosphorus in the additional material is more than 1 and less than 3.

In the presently disclosed method of producing a precursor glass of a lithium phosphorus complex oxide, $Li_2O$ preferably constitutes a proportion of 30 mol % or more in the precursor glass.

Moreover, a presently disclosed method of producing a precursor crystallized glass of a lithium phosphorus complex oxide comprises heating a precursor glass produced by the method of producing a precursor glass set forth above and precipitating crystals of a lithium phosphorus complex oxide and crystals of lithium pyrophosphate.

Furthermore, a presently disclosed method of producing a lithium phosphorus complex oxide powder comprises acid treating a precursor crystallized glass produced by the method of producing a precursor crystallized glass set forth above to elute lithium pyrophosphate.

Also, a presently disclosed precursor glass of a lithium phosphorus complex oxide comprises, by molar ratio:
more than $1+x+y$ and less than $1+x+3y$ of $Li_2O$;
not less than $0.9x$ and not more than $1.1x$ of $M^{III}_2O_3$;
not less than $4-2.2x$ and not more than $4-1.8x$ of $M^{IV}O_2$; and
$3+y$ of $P_2O_5$,
where $0 \leq x \leq 1$, $1 \leq y \leq 5$, $M^{III}$ represents an element selected from Al, Sc, Cr, Fe, Ga, and In, and $M^{IV}$ represents an element selected from Si, Ti, Ge, and Zr.

Moreover, a presently disclosed lithium phosphorus complex oxide powder comprises where $0 \leq x \leq 1$, $M^{III}$ represents an element selected from Al, Sc, Cr, Fe, Ga, and In, and $M^{IV}$ represents an element selected from Si, Ti, Ge, and Zr, and has a concentration of Zn as an impurity of less than 100 ppm.

Advantageous Effect

According to the present disclosure, it is possible to provide a method for producing a precursor glass with which a high-quality lithium phosphorus complex oxide powder can be obtained, and also to provide this precursor glass. Moreover, according to the present disclosure, it is possible to provide a method of using the aforementioned precursor glass to produce a precursor crystallized glass with which a high-quality lithium phosphorus complex oxide powder can be obtained. Furthermore, according to the present disclosure, it is possible to provide a method of using the aforementioned precursor crystallized glass to produce a high-quality lithium phosphorus complex oxide powder, and also to provide this lithium phosphorus complex oxide powder.

BRIEF DESCRIPTION OF THE DRAWINGS

In the accompanying drawings.

DETAILED DESCRIPTION (Method of Producing Precursor Glass of Lithium Phosphorus Complex Oxide)

The following firstly provides a specific description of a method of producing a precursor glass of a lithium phosphorus complex oxide according to one embodiment of the present disclosure (hereinafter, also referred to as the "precursor glass production method according to the present embodiment").

The precursor glass production method according to the present embodiment is a method for producing a precursor glass that can be regarded as a first intermediate product in production of a high-quality lithium phosphorus complex oxide powder. The precursor glass production method according to the present embodiment includes a step (melting step) of melting a material containing constituent elements of the lithium phosphorus complex oxide that is to be produced (hereinafter, also referred to as a "constitutive material"), together with an additional material containing lithium and phosphorus (hereinafter, also referred to as an "additional material"), and has a molar ratio of lithium to phosphorus (Li/P) in the additional material of more than 1 and less than 3.

The term "lithium phosphorus complex oxide" as used in the present specification refers to a compound that contains at least lithium, phosphorus, and oxygen. The specific composition of the lithium phosphorus complex oxide that is to be produced can be selected as appropriate depending on the objective without any specific limitations.

The "material containing constituent elements of the lithium phosphorus complex oxide" (constitutive material) that is prepared in the melting step, in terms of composition thereof, includes a compound containing lithium and phosphorus or includes a compound containing lithium and a compound containing phosphorus, and may further include compounds containing other elements depending on the composition of the lithium phosphorus complex oxide that is to be produced. Such other elements can be selected as appropriate depending on the objective without any specific limitations and examples thereof, other than $M^{III}$ and $M^{IV}$ described further below, include elements that take an oxidation number of +I and elements that take an oxidation number of +II. The constitutive material may be, for example, one or more selected from an oxide, a hydroxide, a carbonate, a nitrate, and a phosphate, but is not specifically limited thereto.

Moreover, the constitutive material normally includes more than one compound and the molar ratio of each element (excluding oxygen) in the constitutive material normally corresponds to the molar ratio of that element in the lithium phosphorus complex oxide that is to be produced. For example, in a case in which the lithium phosphorus complex oxide that is to be produced is $Li_{1+x}Al_xTi_{2-x}(PO_4)_3$, a constitutive material containing these elements is prepared such that Li:Al:Ti:P=1+x:x:2−x:3 (molar ratio).

In addition to the constitutive material described above, an additional material containing lithium and phosphorus (additional material) is prepared and mixed therewith in the melting step to obtain a mixture. The inventor discovered that in production of a lithium phosphorus complex oxide powder, when a material containing lithium and phosphorus in a specific ratio is additionally used and mixed with a material containing lithium, phosphorus, and so forth for forming the powder, and treatment is performed through appropriate steps, this can surprisingly increase the quality of the obtained lithium phosphorus complex oxide powder.

With regards to the specific action, when lithium and phosphorus are additionally introduced in a specific ratio, they promote vitrification and can form a phase that can dissolve in acid. Moreover, the formed phase can easily be eluted and removed using acid. Furthermore, since lithium and phosphorus correspond to constituent elements of the lithium phosphorus complex oxide, the additional introduction thereof does not cause substantial dissolution of impurities during production. This is thought to reduce inclusion of impurities in the finally obtained lithium phosphorus complex oxide powder.

The "additional material containing lithium and phosphorus" (additional material) that is prepared in the melting step can include a compound containing lithium and phosphorus or can include a compound containing lithium and a compound containing phosphorus. The additional material may be, for example, one or more selected from an oxide, a hydroxide, a carbonate, a nitrate, and a phosphate, but is not specifically limited thereto.

As described above, the molar ratio of lithium to phosphorus (Li/P) in the additional material is more than 1 and less than 3. If this molar ratio is 1 or less, stable vitrification may not be possible, a phase that cannot be eluted by acid may be formed, and thus it may not be possible to obtain a lithium phosphorus complex oxide powder of the desired quality. Moreover, if this molar ratio is 3 or more, a phase that cannot be eluted by acid may be formed, and thus it may not be possible to obtain a lithium phosphorus complex oxide powder of the desired quality. From a viewpoint of ensuring higher quality of the obtained lithium phosphorus complex oxide powder, this molar ratio is preferably 1.5 or more, and more preferably 1.8 or more, and is preferably 2.5 or less, and more preferably 2.2 or less.

The proportion constituted by lithium of the additional material among all lithium in the mixture of the constitutive material and the additional material is preferably 53 mol % or more, and is preferably 93 mol % or less, but is not specifically limited thereto. The formation of an unwanted phase that does not elute in acid (for example, a titanium pyrophosphate phase) can be more sufficiently inhibited when this proportion is 53 mol % or more, whereas deterioration of yield can be more sufficiently inhibited when this proportion is 93 mol % or less. From the same viewpoints, the proportion constituted by lithium of the additional material among all lithium is more preferably 58 mol % or more, and is more preferably 88 mol % or less.

In the melting step, melting and vitrification are carried out with respect to the mixture of the constitutive material and the additional material, which are each weighed out so as to constitute a specific proportion. Specifically, the mixture is, for example, loaded into an unreactive vessel such as a platinum crucible, is heated and melted at 1200° C. to 1500° C. in an electric furnace while being agitated in a timely manner, and is then subjected to refining and homogenization in the electric furnace. The molten liquid is caused to flow into a water tank containing a sufficient amount of water and is subjected to granulation quenching or the like to obtain a precursor glass as a first intermediate product.

The proportion constituted by $Li_2O$ in the mixture and the obtained precursor glass is preferably 30 mol % or more, but is not specifically limited thereto. When the proportion constituted by $Li_2O$ is 30 mol % or more, crystallization can be avoided during production of the precursor glass, vitrification can be carried out in a more stable manner, and the finally obtained lithium phosphorus complex oxide powder can be provided with a more uniform particle diameter. Note that the "$Li_2O$" referred to above is inclusive of not only $Li_2O$ originating from lithium in the additional material, but also $Li_2O$ originating from lithium in the constitutive material.

(Precursor Glass of Lithium Phosphorus Complex Oxide)

Next, the following provides a specific description of a precursor glass of a lithium phosphorus complex oxide according to one embodiment of the present disclosure (hereinafter, also referred to as the "precursor glass according to the present embodiment"). The precursor glass according to the present embodiment comprises, by molar ratio:

more than 1+x+y and less than 1+x+3y of $Li_2O$;
not less than 0.9x and not more than 1.1x of $M^{III}_2O_3$;
not less than 4−2.2x and not more than 4−1.8x of $M^{IV}O_2$; and
3+y of $P_2O_5$.

Here, 0≤x≤1, 1≤y≤5, $M^{III}$ represents an element selected from Al, Sc, Cr, Fe, Ga, and In, and $M^{IV}$ represents an element selected from Si, Ti, Ge, and Zr. Through the precursor glass according to the present embodiment, it is possible to obtain, with high quality, a powder of a lithium phosphorus complex oxide, and specifically a lithium phosphorus complex oxide represented by $Li_{1+x}M^{III}_xM^{IV}_{2-x}(PO_4)_3$.

The precursor glass according to the present embodiment can be regarded as a first intermediate product in production of a high-quality lithium phosphorus complex oxide powder and can be produced, for example, by the precursor glass production method according to the present embodiment set forth above.

The precursor glass according to the present embodiment preferably comprises, by molar ratio:

more than 1+x+y and less than 1+x+3y of $Li_2O$;
x of $M^{III}_2O_3$;
4−2x of $M^{IV}O_2$; and
3+y of $P_2O_5$.

Note that x is a variable of not less than 0 and not more than 1 that contributes to the molar ratios of $Li_2O$, $M^{III}_2O_3$, and $M^{IV}O_2$ in the precursor glass and is related to the composition of the lithium phosphorus complex oxide that is to be produced. From a viewpoint of ensuring that crystal structure collapse is avoided, x is preferably 0.8 or less, and more preferably 0.6 or less.

On the other hand, y is a variable of not less than 1 and not more than 5 that contributes to the molar ratios of $Li_2O$ and $P_2O_5$ in the precursor glass and can influence the quality of the lithium phosphorus complex oxide powder that is finally produced. From a viewpoint of increasing the quality of the powder of the lithium phosphorus complex oxide that is finally obtained, y is preferably 1.5 or more, and more preferably 2 or more, and is preferably 4.5 or less, and more preferably 4 or less.

The molar ratio of $Li_2O$ in the precursor glass according to the present embodiment is more than $1+x+y$ and less than $1+x+3y$. Examples of materials for the $Li_2O$ include phosphates such as $LiPO_3$ and carbonates such as $Li_2CO_3$.

The molar ratio of $M^{III}_2O_3$ in the precursor glass according to the present embodiment is not less than $0.9x$ and not more than $1.1x$. $M^{III}$ represents an element selected from Al, Sc, Cr, Fe, Ga, and In as previously described and can take an oxidation number of +III. Of these elements, $M^{III}$ is preferably an element selected from Al, Cr, and Fe. Examples of materials for the $M^{III}_2O_3$ include phosphates ($Al(PO_3)_3$, etc.), hydroxides ($Al(OH)_3$, etc.), and oxides ($Al_2O_3$, $Cr_2O_3$, $Fe_2O_3$, etc.).

The molar ratio of $M^{IV}O_2$ in the precursor glass according to the present embodiment is not less than $4-2.2x$ and not more than $4-1.8x$. $M^{IV}$ represents an element selected from Si, Ti, Ge, and Zr as previously described and can take an oxidation number of +IV. Of these elements, $M^{IV}$ is preferably an element selected from Ti and Zr. Examples of materials for the $M^{IV}O_2$ include phosphates ($TiP_2O_7$, etc.) and oxides ($TiO_2$, $SiO_2$, $GeO_2$, $ZrO_2$, etc.).

The molar ratio of $P_2O_5$ in the precursor glass according to the present embodiment is $3+y$. Examples of materials for the $P_2O_5$ include any phosphate, acids such as $H_3PO_4$, and oxides such as $P_2O_5$.

The precursor glass according to the present embodiment is preferably not crystallized. As a result of the precursor glass not being crystallized, the lithium phosphorus complex oxide powder that is finally obtained can be provided with a more uniform particle diameter.

(Method of Producing Precursor Crystallized Glass of Lithium Phosphorus Complex Oxide)

Next, the following provides a specific description of a method of producing a precursor crystallized glass of a lithium phosphorus complex oxide according to one embodiment of the present disclosure (hereinafter, also referred to as the "precursor crystallized glass production method according to the present embodiment").

The precursor crystallized glass production method according to the present embodiment is a method for producing a precursor crystallized glass that can be regarded as a second intermediate product in production of a high-quality lithium phosphorus complex oxide powder. The precursor crystallized glass production method according to the present embodiment includes a step (precipitation step) of heating the precursor glass set forth above and precipitating crystals of a lithium phosphorus complex oxide and crystals of lithium pyrophosphate.

The heating of the precursor glass in the precipitation step can be performed, for example, by two-stage heating at 400° C. to 600° C. for 10 hours to 30 hours and at 600° C. to 900° C. for 10 hours to 30 hours. Through this heat treatment, it is possible to obtain a precursor crystallized glass as a second intermediate product having at least crystals of a lithium phosphorus complex oxide and crystals of lithium pyrophosphate ($Li_4P_2O_7$) precipitated therein.

Note that in the precipitation step, just the crystals described above may be precipitated, or other crystals of lithium metaphosphate ($LiPO_3$), lithium phosphate ($Li_3PO_4$), or the like may also be precipitated, for example. However, from a viewpoint of increasing the quality of a powder of a lithium phosphorus complex oxide that is finally obtained, the precipitated amount of crystals of lithium metaphosphate ($LiPO_3$), lithium phosphate ($Li_3PO_4$), and the like is preferably small.

(Method of Producing Lithium Phosphorus Complex Oxide Powder)

Next, the following provides a specific description of a method of producing a lithium phosphorus complex oxide powder according to one embodiment of the present disclosure (hereinafter, also referred to as the "powder production method according to the present embodiment").

The powder production method according to the present embodiment includes a step (acid treatment step) of acid treating the precursor crystallized glass set forth above to elute lithium pyrophosphate.

In the acid treatment step, the precursor crystallized glass may, for example, be immersed in 1N to 5N nitric acid or 1N to 5N hydrochloric acid at 30° C. to 90° C. for 2 hours to 24 hours. It is preferable that agitation using a stirrer or the like is performed during the immersion. This acid treatment causes the selective elution of crystals other than crystals of the lithium phosphorus complex oxide (i.e., crystals including at least crystals of lithium pyrophosphate). A high-quality lithium phosphorus complex oxide powder can then be obtained by, after the acid treatment, separating the crystals of the lithium phosphorus complex oxide and the eluate by filtration or the like, and drying the crystals.

Note that crystals of lithium pyrophosphate have a high solubility with respect to acid compared to crystals of zinc pyrophosphate ($Zn_2P_2O_7$) that are precipitated in a conventional technique. Accordingly, the powder production method according to the present embodiment has a high effect of elution and removal of a phase that can become an impurity compared to the conventional technique.

(Lithium Phosphorus Complex Oxide Powder)

Next, the following provides a specific description of a lithium phosphorus complex oxide powder according to one embodiment of the present disclosure (hereinafter, also referred to as the "lithium phosphorus complex oxide powder according to the present embodiment").

The lithium phosphorus complex oxide powder according to the present embodiment comprises $Li_{1+x}M^{III}_xM^{IV}_{2-x}(PO_4)_3$ ($0 \leq x \leq 1$, $M^{III}$ represents an element selected from Al, Sc, Cr, Fe, Ga, and In, and $M^{IV}$ represents an element selected from Si, Ti, Ge, and Zr) and has a concentration of Zn as an impurity of less than 100 ppm. In this manner, the lithium phosphorus complex oxide powder according to the present embodiment has reduced impurities and high-quality.

The lithium phosphorus complex oxide powder according to the present embodiment can be produced, for example, by the powder production method according to the present embodiment set forth above.

Moreover, the concentration of Zn can be measured by X-ray fluorescence analysis.

Preferable forms of x, $M^{III}$, and $M^{IV}$ are the same as already described for the precursor glass of a lithium phosphorus complex oxide.

The particle diameter of the lithium phosphorus complex oxide powder as measured by laser diffraction/scattering is preferably 0.1 μm to 10 μm. Moreover, the standard deviation of the particle diameter of the lithium phosphorus complex oxide powder is preferably less than 2 μm.

The concentration of impurities other than Zn in the lithium phosphorus complex oxide powder is preferably also low. For example, the concentration of elements other than the constituent elements of the lithium phosphorus complex oxide is preferably less than 2,000 ppm.

EXAMPLES

The following provides a more specific description of the present disclosure through examples and comparative examples. However, the present disclosure is not limited to these examples.

Example 1

Production of $Li_{1.4}Al_{0.4}Ti_{1.6}(PO_4)_3$

A lithium phosphorus complex oxide represented by $Li_{1.4}Al_{0.4}Ti_{1.6}(PO_4)_3$ was produced by the following procedure.

$LiPO_3$, $Al(PO_3)_3$, $Ti_2P_2O_7$, and $TiO_2$ that had been weighed out in specific amounts were prepared as a constitutive material such that, by molar ratio, Li:Al:Ti:P=1.4:0.4:1.6:3 (calculated in terms of oxides: $Li_2O$=1.4, $Al_2O_3$=0.4, $TiO_2$=3.2, $P_2O_5$=3). In addition, $LiPO_3$ and $Li_2CO_3$ that had been weighed out in specific amounts were prepared as an additional material such that, by molar ratio calculated in terms of oxides, $Li_2O$=6 and $P_2O_5$=3 (Li/P=2). These materials were mixed and were melted to produce a precursor glass (x=0.4, y=3) comprising $Li_2O$ (=7.4), $Al_2O_3$ (=0.4), $TiO_2$ (=3.2), and $P_2O_5$ (=6) (molar ratio). The proportion constituted by $Li_2O$ in the mixture and the precursor glass was calculated to be 43.5 mol %.

Next, the precursor glass was heated at 500° C. for 10 hours and at 700° C. for 10 hours to produce a precursor crystallized glass.

The precursor crystallized glass was subsequently immersed in 3 mol/L $HNO_3$ aqueous solution and was agitated at 60° C. for 2 hours to perform acid treatment and thereby obtain a white cloudy solution. Dispersed particles were removed from the white cloudy solution by filtration and were dried at 120° C. to obtain a white powder. It was confirmed that at least lithium pyrophosphate had eluted in the filtrate.

Example 2

Production of $LiTi_2(PO_4)_3$

A lithium phosphorus complex oxide represented by $LiTi_2(PO_4)_3$ was produced by the following procedure.

$LiPO_3$, $Ti_2P_2O_7$, and $TiO_2$ that had been weighed out in specific amounts were prepared as a constitutive material such that, by molar ratio, Li:Ti:P=1:2:3 (calculated in terms of oxides: $Li_2O$=1, $TiO_2$=4, $P_2O_5$=3). In addition, $LiPO_3$ and $Li_2CO_3$ that had been weighed out in specific amounts were prepared as an additional material such that, by molar ratio calculated in terms of oxides, $Li_2O$=4.5 and $P_2O_5$=3 (Li/P=1.5). These materials were mixed and were melted to produce a precursor glass (x=0, y=3) comprising $Li_2O$ (=5.5), $TiO_2$ (=4), and $P_2O_5$ (=6) (molar ratio). The proportion constituted by $Li_2O$ in the mixture and the precursor glass was calculated to be 35.5 mol %.

Next, the precursor glass was heated at 500° C. for 10 hours and at 700° C. for 10 hours to produce a precursor crystallized glass.

The precursor crystallized glass was subsequently immersed in 3 mol/L $HNO_3$ aqueous solution and was agitated at 60° C. for 2 hours to perform acid treatment and thereby obtain a white cloudy solution. Dispersed particles were removed from the white cloudy solution by filtration and were dried at 120° C. to obtain a white powder. It was confirmed that at least lithium pyrophosphate had eluted in the filtrate.

Example 3

Production of $Li_{1.2}Cr_{0.2}Ti_{1.8}(PO_4)_3$

A lithium phosphorus complex oxide represented by $Li_{1.2}Cr_{0.2}Ti_{1.8}(PO_4)_3$ was produced by the following procedure.

$LiPO_3$, $Ti_2P_2O_7$, $Cr_2O_3$, and $TiO_2$ that had been weighed out in specific amounts were prepared as a constitutive material such that, by molar ratio, Li:Cr:Ti:P=1.2:0.2:1.8:3 (calculated in terms of oxides: $Li_2O$=1.2, $Cr_2O_3$=0.2, $TiO_2$=3.6, $P_2O_5$=3). In addition, $LiPO_3$ and $Li_2CO_3$ that had been weighed out in specific amounts were prepared as an additional material such that, by molar ratio calculated in terms of oxides, $Li_2O$=5 and $P_2O_5$=2 (Li/P=2.5). These materials were mixed and were melted to produce a precursor glass (x=0.2, y=2) comprising $Li_2O$ (=6.2), $Cr_2O_3$ (=0.2), $TiO_2$ (=3.6), and $P_2O_5$ (=5) (molar ratio). The proportion constituted by $Li_2O$ in the mixture and the precursor glass was calculated to be 41.3 mol %.

Next, the precursor glass was heated at 500° C. for 10 hours and at 700° C. for 10 hours to produce a precursor crystallized glass.

The precursor crystallized glass was subsequently immersed in 3 mol/L $HNO_3$ aqueous solution and was agitated at 60° C. for 2 hours to perform acid treatment and thereby obtain a white cloudy solution. Dispersed particles were removed from the white cloudy solution by filtration and were dried at 120° C. to obtain a white powder. It was confirmed that at least lithium pyrophosphate had eluted in the filtrate.

Example 4

Production of $Li_{1.4}Al_{0.4}Ti_{1.6}(PO_4)_3$

A lithium phosphorus complex oxide represented by $Li_{1.4}Al_{0.4}Ti_{1.6}(PO_4)_3$ was produced by the following procedure.

$LiPO_3$, $Al(PO_3)_3$, $Ti_2P_2O_7$, and $TiO_2$ that had been weighed out in specific amounts were prepared as a constitutive material such that, by molar ratio, Li:Al:Ti:P=1.4:0.4:1.6:3 (calculated in terms of oxides: $Li_2O$=1.4, $Al_2O_3$=0.4, $TiO_2$=3.2, $P_2O_5$=3). In addition, $LiPO_3$ and $Li_2CO_3$ that had been weighed out in specific amounts were prepared as an additional material such that, by molar ratio calculated in terms of oxides, $Li_2O$=1.5 and $P_2O_5$=1 (Li/P=1.5). These materials were mixed and were melted to produce a precursor glass (x=0.4, y=1) comprising $Li_2O$ (=2.9), $Al_2O_3$ (=0.4), $TiO_2$ (=3.2), and $P_2O_5$ (=4) (molar ratio). Note that the produced precursor glass had crystallized. The proportion constituted by $Li_2O$ in the mixture and the precursor glass was calculated to be 27.6 mol %.

Next, the precursor glass was heated at 500° C. for 10 hours and at 700° C. for 10 hours to produce a precursor crystallized glass.

The precursor crystallized glass was subsequently immersed in 3 mol/L $HNO_3$ aqueous solution and was agitated at 60° C. for 12 hours to perform acid treatment and thereby obtain a white cloudy solution. Dispersed particles were removed from the white cloudy solution by filtration and were dried at 120° C. to obtain a white powder. It was confirmed that at least lithium pyrophosphate had eluted in the filtrate.

Example 5

Production of $Li_{1.3}Fe_{0.3}Ti_{1.7}(PO_4)_3$

A lithium phosphorus complex oxide represented by $Li_{1.3}Fe_{0.3}Ti_{1.7}(PO_4)_3$ was produced by the following procedure.

$LiPO_3$, $Fe_2O_3$, $Ti_2P_2O_7$, and $TiO_2$ that had been weighed out in specific amounts were prepared as a constitutive material such that, by molar ratio, Li:Fe:Ti:P=1.3:0.3:1.7:3 (calculated in terms of oxides: $Li_2O$=1.3, $Fe_2O_3$=0.3, $TiO_2$=3.4, $P_2O_5$=3). In addition, $LiPO_3$ and $Li_2CO_3$ that had been weighed out in specific amounts were prepared as an additional material such that, by molar ratio calculated in terms of oxides, $Li_2O$=6 and $P_2O_5$=3 (Li/P=2). These materials were mixed and were melted to produce a precursor glass (x=0.3, y=3) comprising $Li_2O$ (=7.3), $Fe_2O_3$ (=0.3), $TiO_2$ (=3.4), and $P_2O_5$ (=6) (molar ratio). The proportion constituted by $Li_2O$ in the mixture and the precursor glass was calculated to be 42.9 mol %.

Next, the precursor glass was heated at 500° C. for 10 hours and at 700° C. for 10 hours to produce a precursor crystallized glass.

The precursor crystallized glass was subsequently immersed in 3 mol/L $HNO_3$ aqueous solution and was agitated at 60° C. for 3 hours to perform acid treatment and thereby obtain a white cloudy solution. Dispersed particles were removed from the white cloudy solution by filtration and were dried at 120° C. to obtain a white powder. It was confirmed that at least lithium pyrophosphate had eluted in the filtrate.

Example 6

Production of $LiZr_2(PO_4)_3$

A lithium phosphorus complex oxide represented by $LiZr_2(PO_4)_3$ was produced by the following procedure.

$LiPO_3$, $ZrO_2$, and $H_3PO_4$ that had been weighed out in specific amounts were prepared as a constitutive material such that, by molar ratio, Li:Zr:P=1:2:3 (calculated in terms of oxides: $Li_2O$=1, $ZrO_2$=4, $P_2O_5$=3). In addition, $LiPO_3$ and $Li_2CO_3$ that had been weighed out in specific amounts were prepared as an additional material such that, by molar ratio calculated in terms of oxides, $Li_2O$=10 and $P_2O_5$=5 (Li/P=2). These materials were mixed and were melted to produce a precursor glass (x=0, y=5) comprising $Li_2O$ (=11), $ZrO_2$ (=4), and $P_2O_5$ (=8) (molar ratio). The proportion constituted by $Li_2O$ in the mixture and the precursor glass was calculated to be 47.8 mol %.

Next, the precursor glass was heated at 450° C. for 10 hours and at 650° C. for 10 hours to produce a precursor crystallized glass.

The precursor crystallized glass was subsequently immersed in 3 mol/L $HNO_3$ aqueous solution and was agitated at 60° C. for 3 hours to perform acid treatment and thereby obtain a white cloudy solution. Dispersed particles were removed from the white cloudy solution by filtration and were dried at 120° C. to obtain a white powder. It was confirmed that at least lithium pyrophosphate had eluted in the filtrate.

Comparative Example 1

A lithium phosphorus complex oxide represented by $Li_{1.4}Al_{0.4}Ti_{1.6}(PO_4)_3$ was produced by the following procedure.

$LiPO_3$, $Al(PO_3)_3$, $TiP_2O_7$, and $TiO_2$ that had been weighed out in specific amounts were prepared as a constitutive material such that, by molar ratio, Li:Al:Ti:P=1.4:0.4:1.6:3 (calculated in terms of oxides: $Li_2O$=1.4, $Al_2O_3$=0.4, $TiO_2$=3.2, $P_2O_5$=3). In addition, $LiPO_3$ that had been weighed out in a specific amount was prepared as an additional material such that, by molar ratio calculated in terms of oxides, $Li_2O$=3 and $P_2O_5$=3 (Li/P=1). These materials were mixed and were melted to produce a precursor glass comprising $Li_2O$ (=4.4), $Al_2O_3$ (=0.4), $TiO_2$ (=3.2), and $P_2O_5$ (=6) (molar ratio). The proportion constituted by $Li_2O$ in the mixture and the precursor glass was calculated to be 31.4 mol %.

Next, the precursor glass was heated at 500° C. for 10 hours and at 700° C. for 10 hours to produce a precursor crystallized glass.

The precursor crystallized glass was subsequently immersed in 3 mol/L $HNO_3$ aqueous solution and was agitated at 60° C. for 10 hours to perform acid treatment and thereby obtain a white cloudy solution. Dispersed particles were removed from the white cloudy solution by filtration and were dried at 120° C. to obtain a white powder.

Comparative Example 2

A lithium phosphorus complex oxide represented by $Li_{1.4}Al_{0.4}Ti_{1.6}(PO_4)_3$ was produced by the following procedure.

$LiPO_3$, $Al(PO_3)_3$, $TiP_2O_7$, and $TiO_2$ that had been weighed out in specific amounts were prepared as a constitutive material such that, by molar ratio, Li:Al:Ti:P=1.4:0.4:1.6:3 (calculated in terms of oxides: $Li_2O$=1.4, $Al_2O_3$=0.4, $TiO_2$=3.2, $P_2O_5$=3). In addition, $LiPO_3$ and $Li_2CO_3$ that had been weighed out in specific amounts were prepared as an additional material such that, by molar ratio calculated in terms of oxides, $Li_2O$=9 and $P_2O_5$=3 (Li/P=3). These materials were mixed and were melted to produce a precursor glass comprising $Li_2O$ (=10.4), $Al_2O_3$ (=0.4), $TiO_2$ (=3.2), and $P_2O_5$ (=6) (molar ratio). The proportion constituted by $Li_2O$ in the mixture and the precursor glass was calculated to be 52.0 mol %.

Next, the precursor glass was heated at 500° C. for 10 hours and at 700° C. for 10 hours to produce a precursor crystallized glass.

The precursor crystallized glass was subsequently immersed in 3 mol/L $HNO_3$ aqueous solution and was agitated at 60° C. for 2 hours to perform acid treatment and thereby obtain a white cloudy solution. Dispersed particles were removed from the white cloudy solution by filtration and were dried at 120° C. to obtain a white powder.

Comparative Example 3

A lithium phosphorus complex oxide represented by $Li_{1.4}Al_{0.4}Ti_{1.6}(PO_4)_3$ was produced by the following procedure.

$LiPO_3$, $Al(PO_3)_3$, $Zn(PO_3)_2$, $TiO_2$, and ZnO that had been weighed out in specific amounts were prepared, and these materials were mixed and melted to produce a precursor glass comprising $Li_2O$ (=1.4), $Al_2O_3$ (=0.4), $TiO_2$ (=3.2), $P_2O_5$ (=6), and ZnO (=6) (molar ratio). The proportion constituted by $Li_2O$ in the mixture and the precursor glass was calculated to be 8.2 mol %.

Next, the precursor glass was heated at 500° C. for 10 hours and at 800° C. for 10 hours to produce a precursor crystallized glass.

The precursor crystallized glass was subsequently immersed in 3 mol/L $HNO_3$ aqueous solution and was agitated at 60° C. for 10 hours to perform acid treatment and thereby obtain a white cloudy solution. Dispersed particles were removed from the white cloudy solution by filtration and were dried at 120° C. to obtain a white powder.

(X-Ray Diffraction Spectrum of Precursor Crystallized Glass)

An X-ray diffractometer Ultima IV (produced by Rigaku Corporation) was used to measure an X-ray diffraction spectrum for the precursor crystallized glass obtained in the production process of the lithium phosphorus complex oxide powder in each example or comparative example. X-ray diffraction spectra for the precursor crystallized glasses of Examples 1 to 6 and Comparative Examples 1 to 3 are illustrated in FIGS. 1 to 9.

Figure 1:
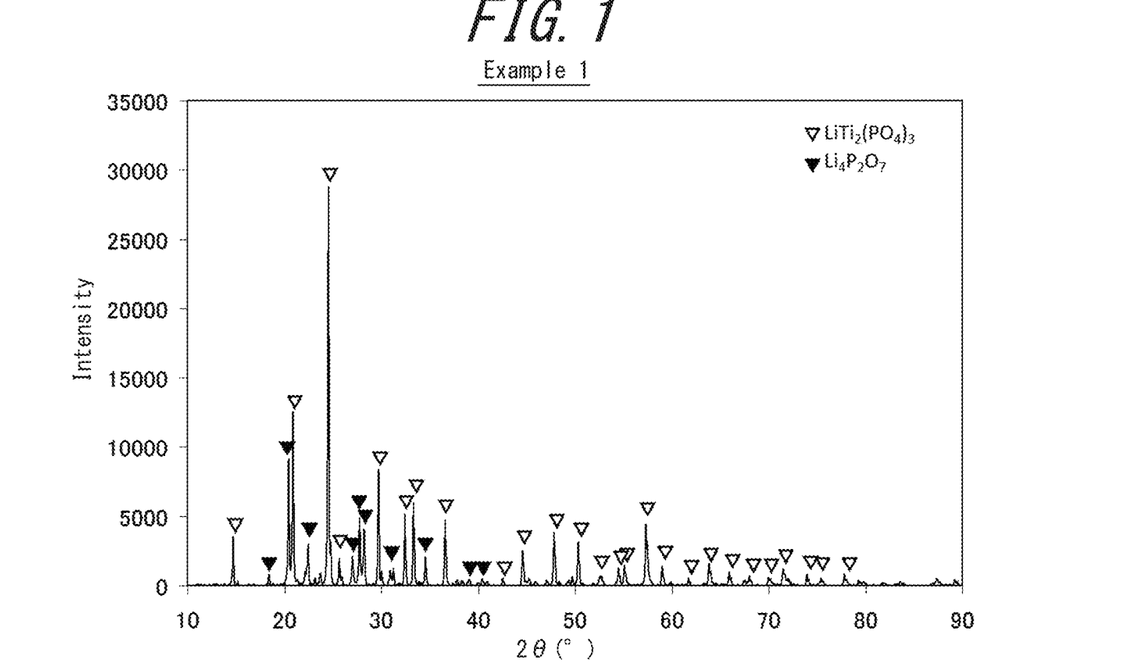
FIG. 1 illustrates an X-ray diffraction pattern of a precursor crystallized glass in Example 1.
Figure 2:
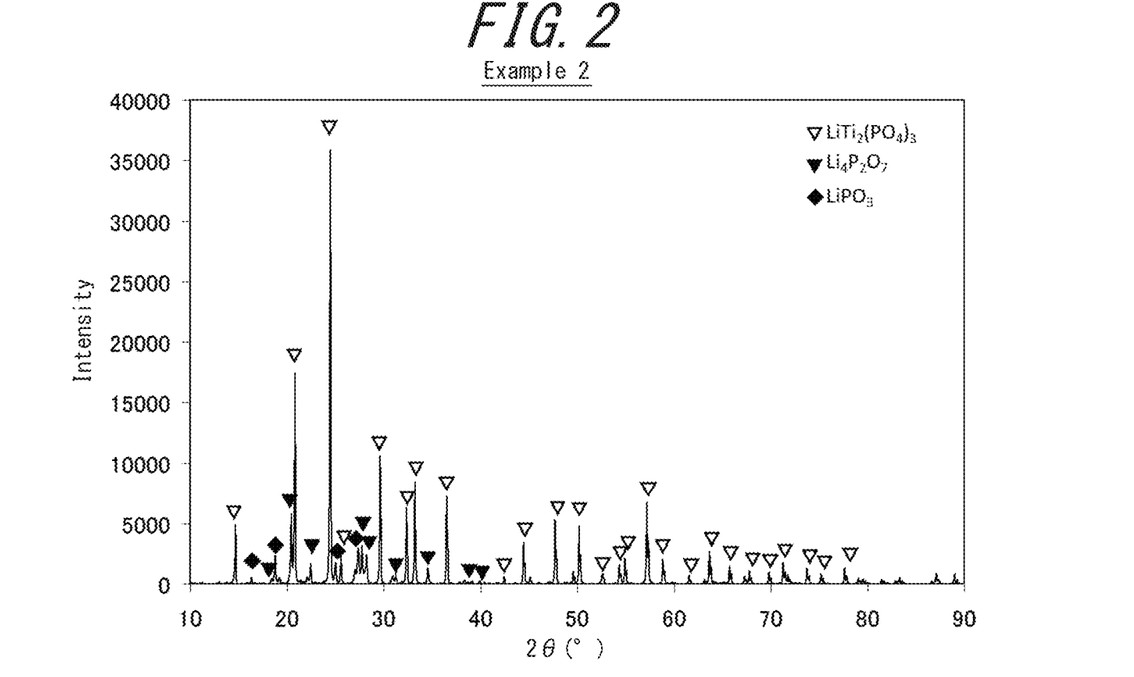
FIG. 2 illustrates an X-ray diffraction pattern of a precursor crystallized glass in Example 2.
Figure 3:
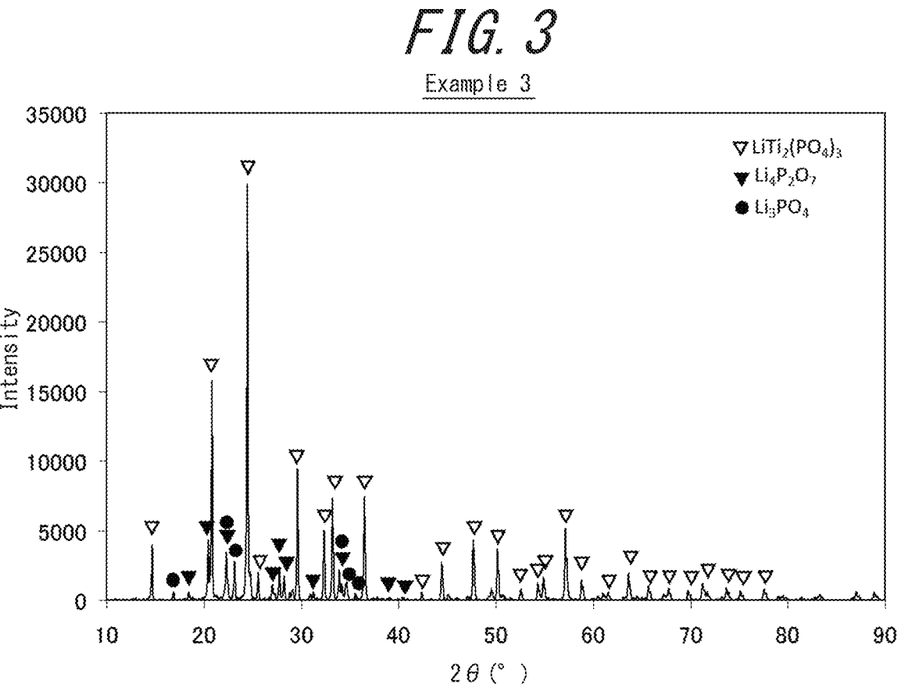
FIG. 3 illustrates an X-ray diffraction pattern of a precursor crystallized glass in Example 3.
Figure 4:
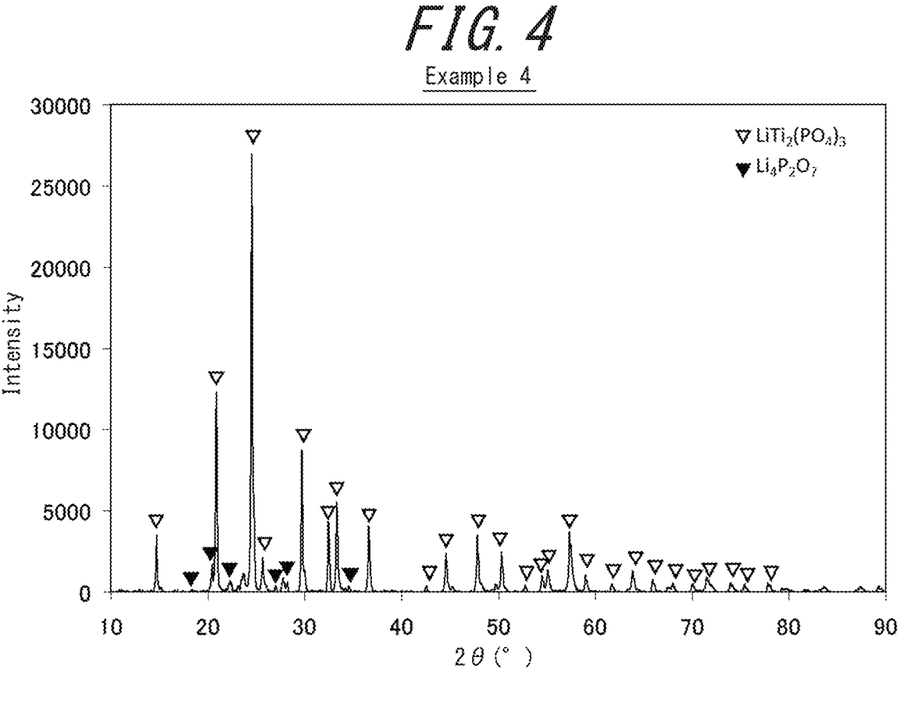
FIG. 4 illustrates an X-ray diffraction pattern of a precursor crystallized glass in Example 4.
Figure 5:
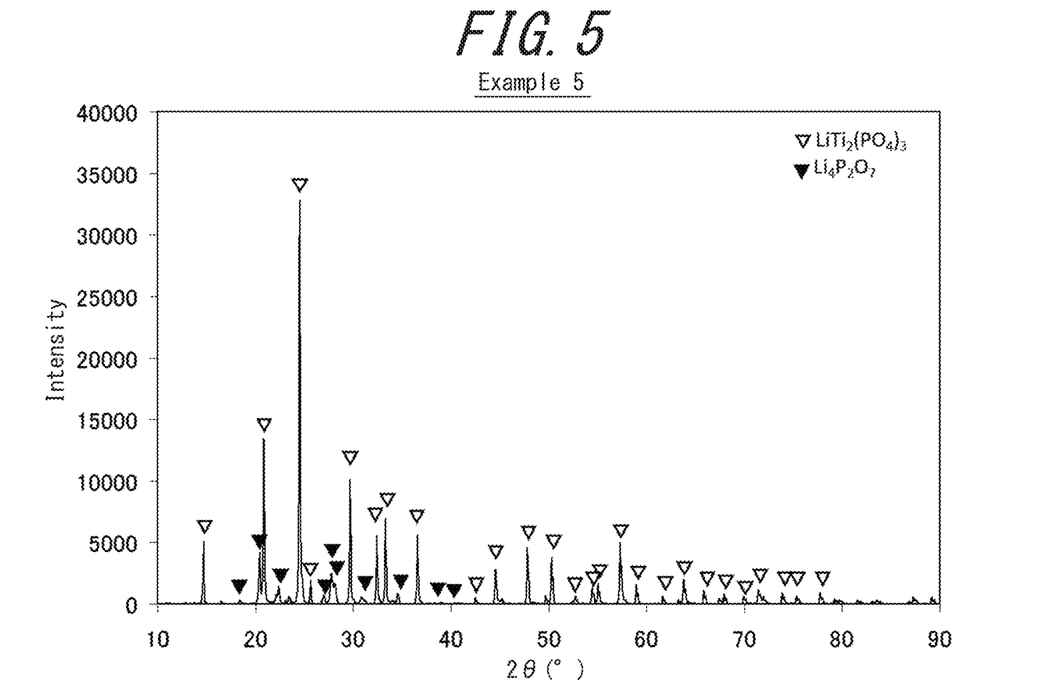
FIG. 5 illustrates an X-ray diffraction pattern of a precursor crystallized glass in Example 5.
Figure 6:
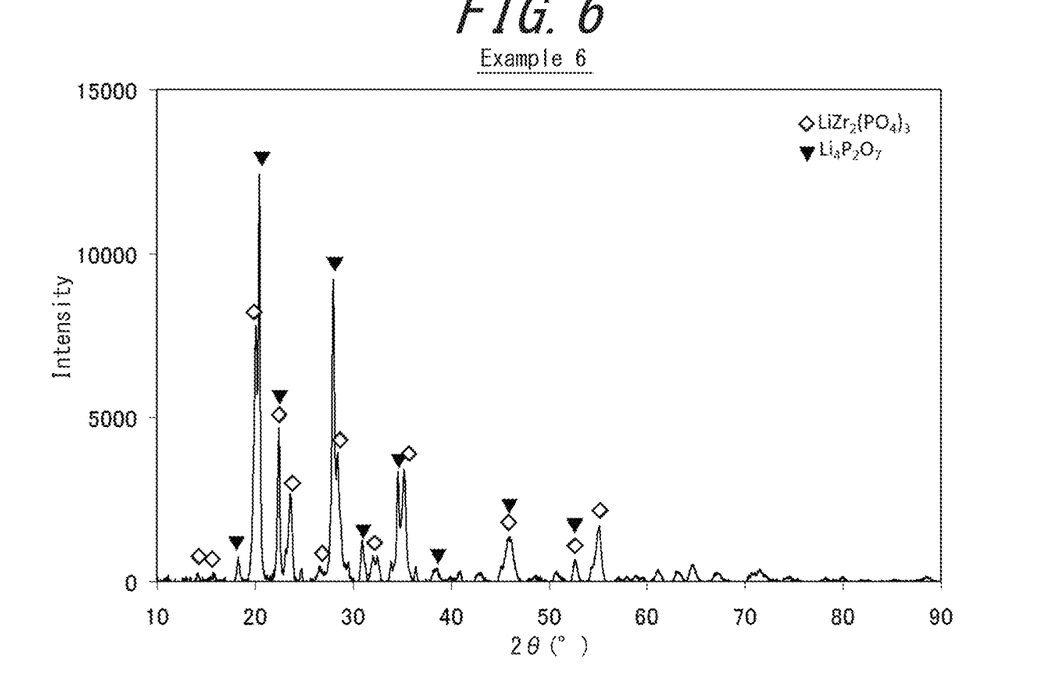
FIG. 6 illustrates an X-ray diffraction pattern of a precursor crystallized glass in Example 6.
Figure 7:
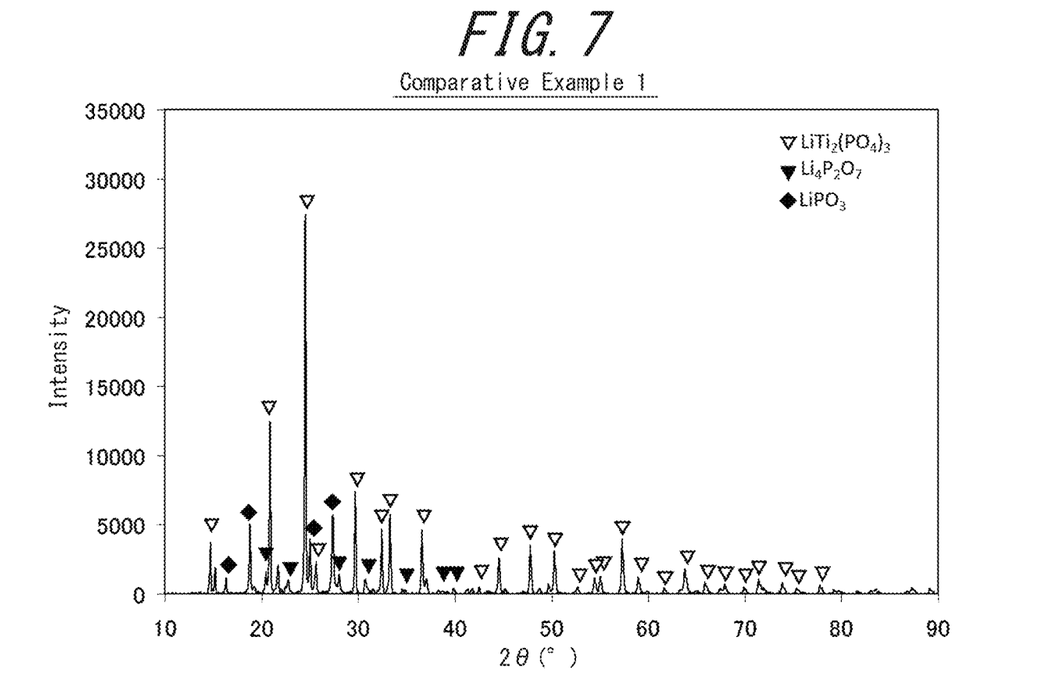
FIG. 7 illustrates an X-ray diffraction pattern of a precursor crystallized glass in Comparative Example 1.
Figure 8:
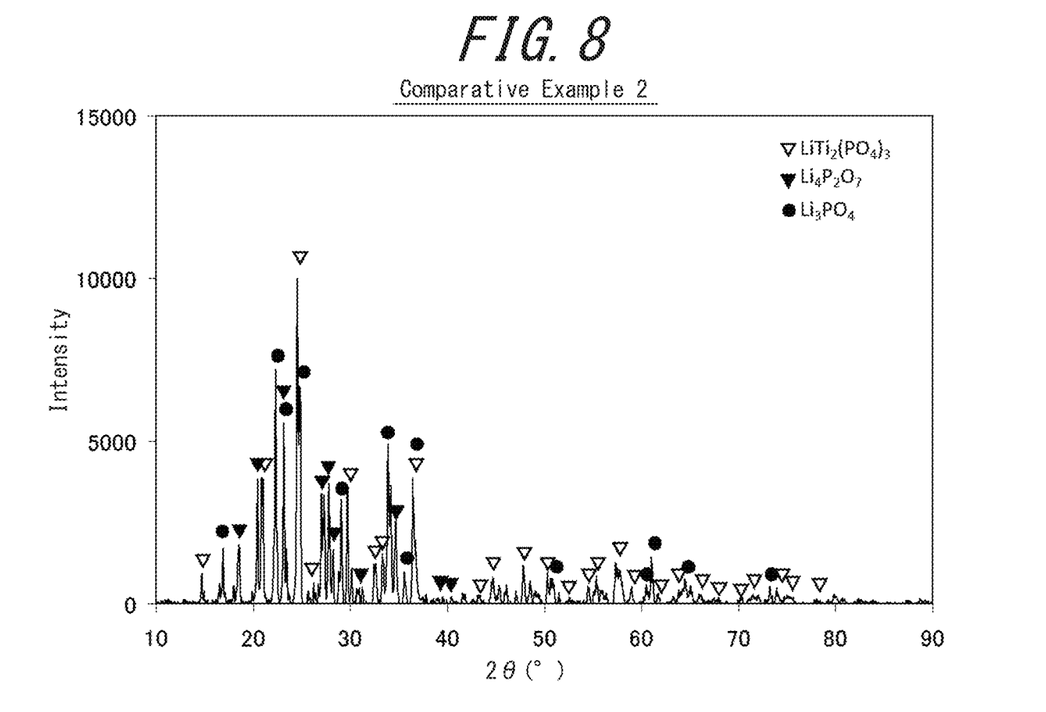
FIG. 8 illustrates an X-ray diffraction pattern of a precursor crystallized glass in Comparative Example 2.
Figure 9:
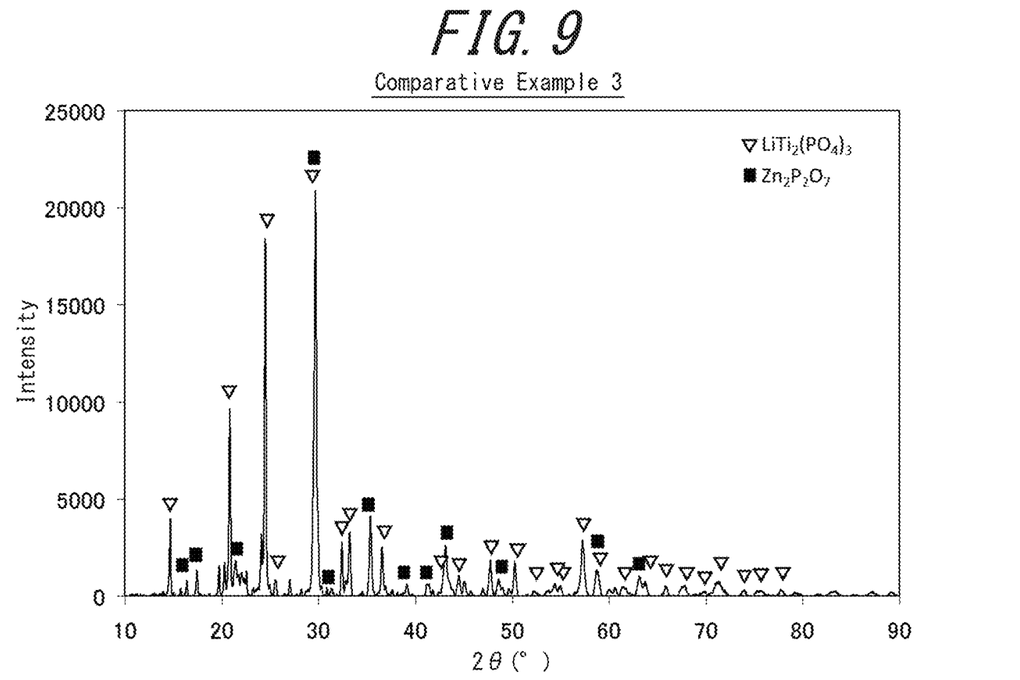
FIG. 9 illustrates an X-ray diffraction pattern of a precursor crystallized glass in Comparative Example 3.
Figure 10:
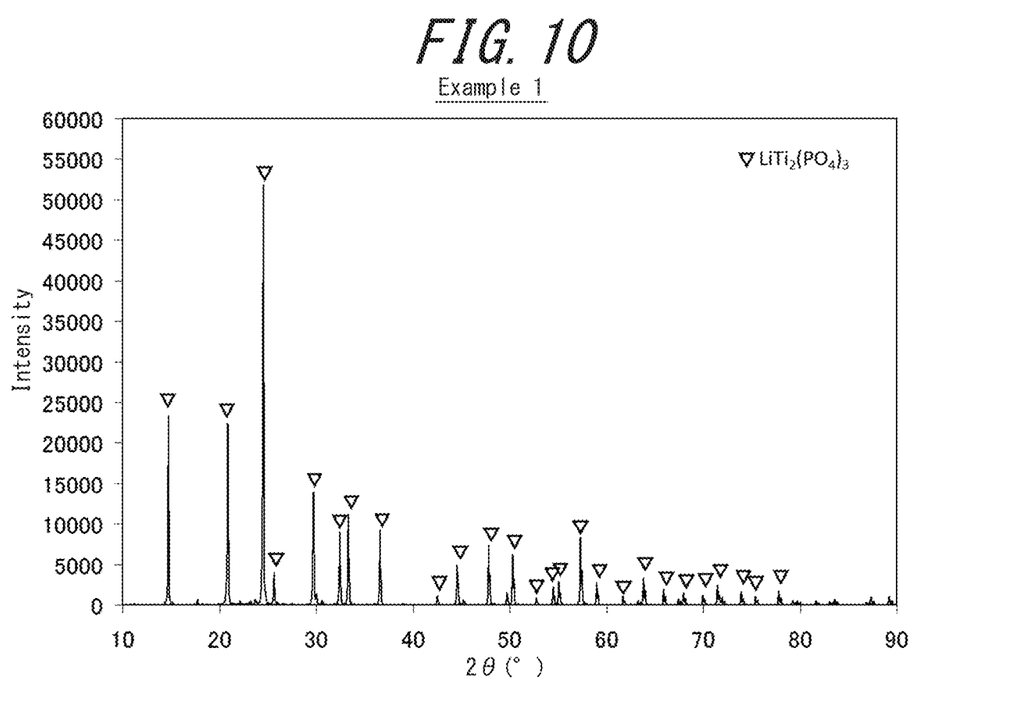
FIG. 10 illustrates an X-ray diffraction pattern of a powder in Example 1.
Figure 11:
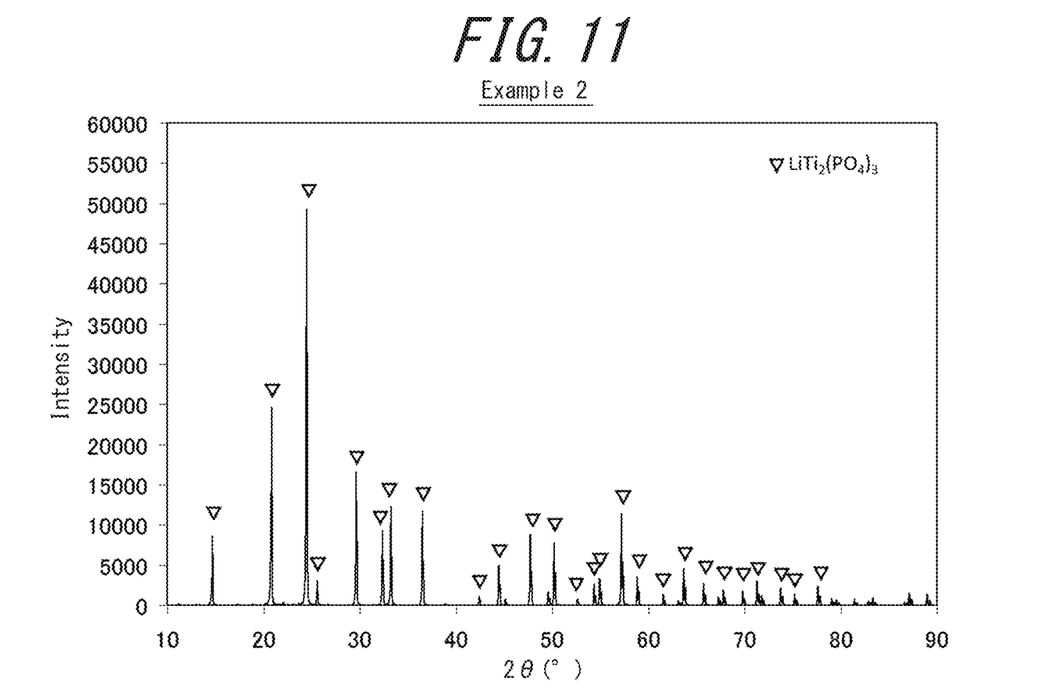
FIG. 11 illustrates an X-ray diffraction pattern of a powder in Example 2.
Figure 12:
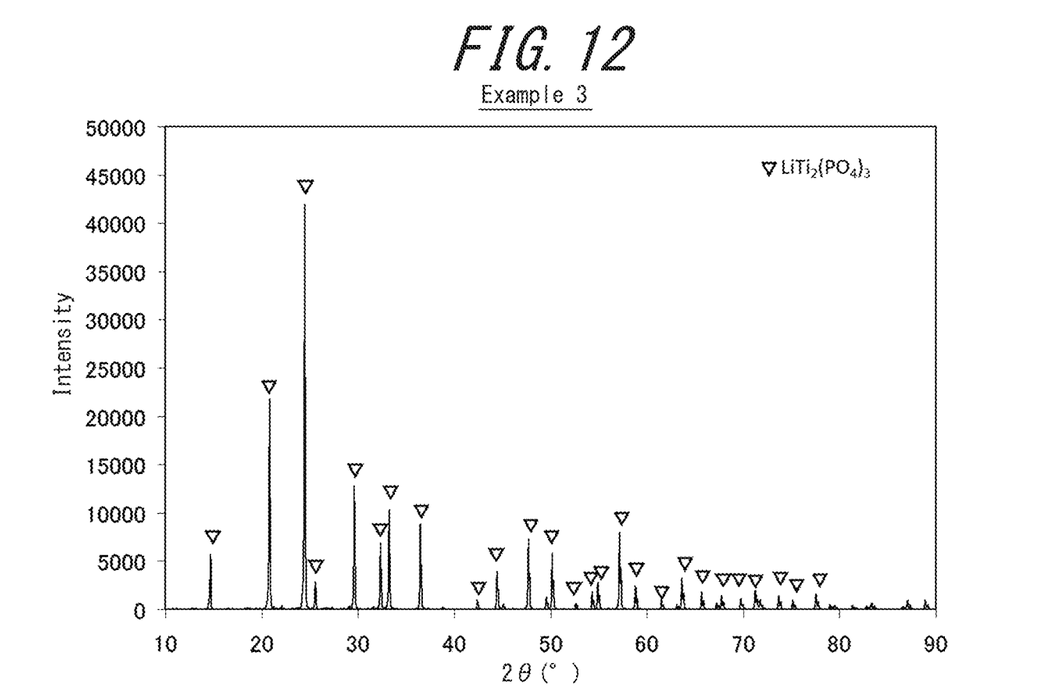
FIG. 12 illustrates an X-ray diffraction pattern of a powder in Example 3.
Figure 13:
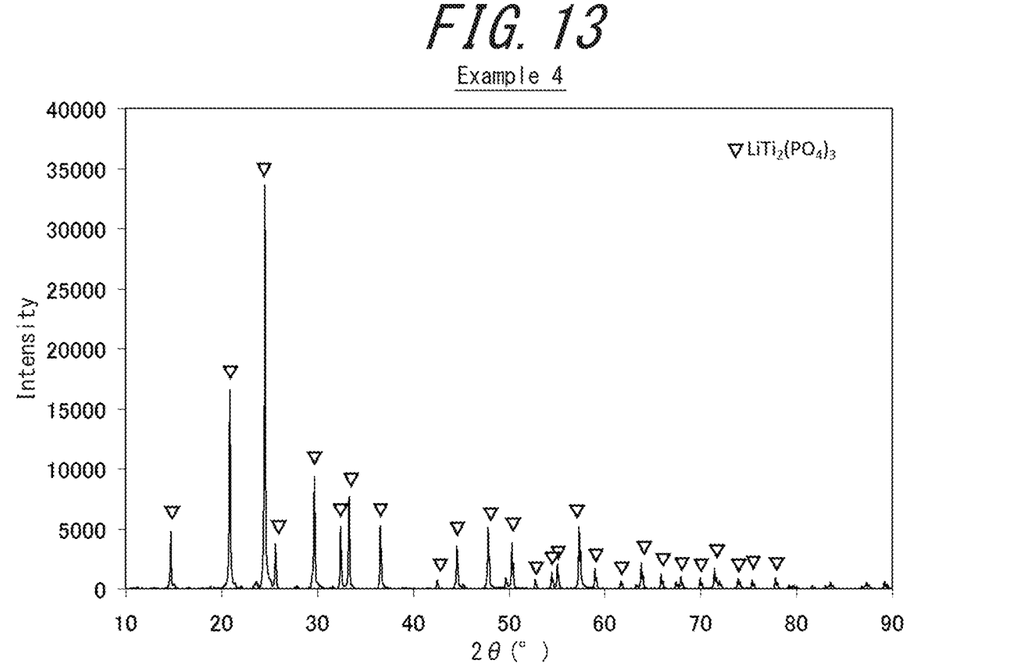
FIG. 13 illustrates an X-ray diffraction pattern of a powder in Example 4.
Figure 14:
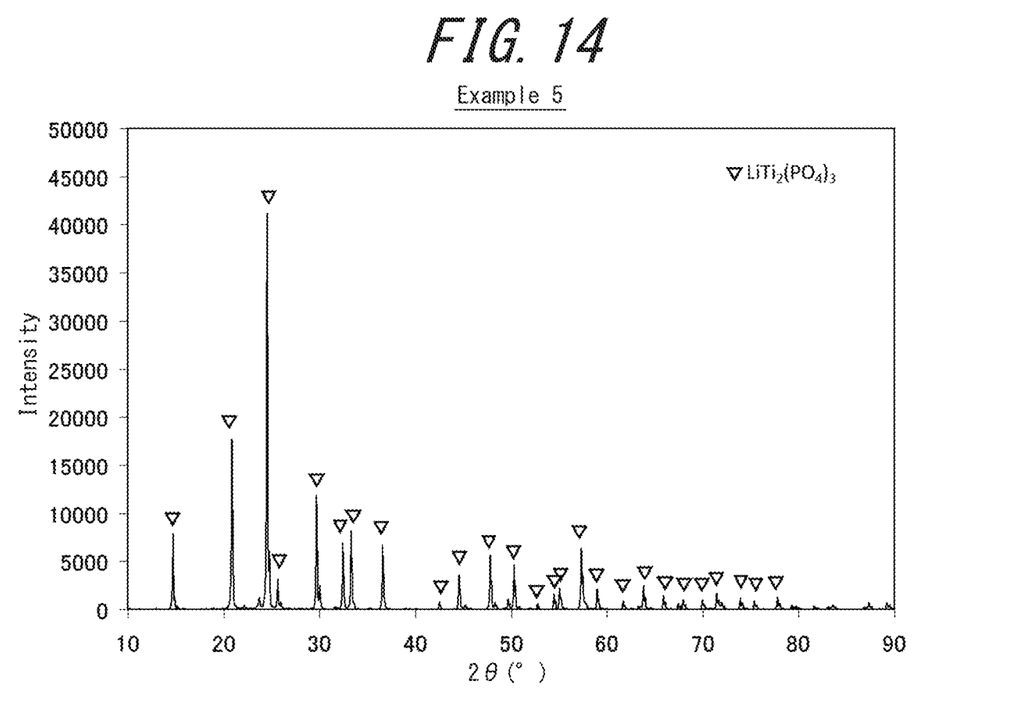
FIG. 14 illustrates an X-ray diffraction pattern of a powder in Example 5.
Figure 15:
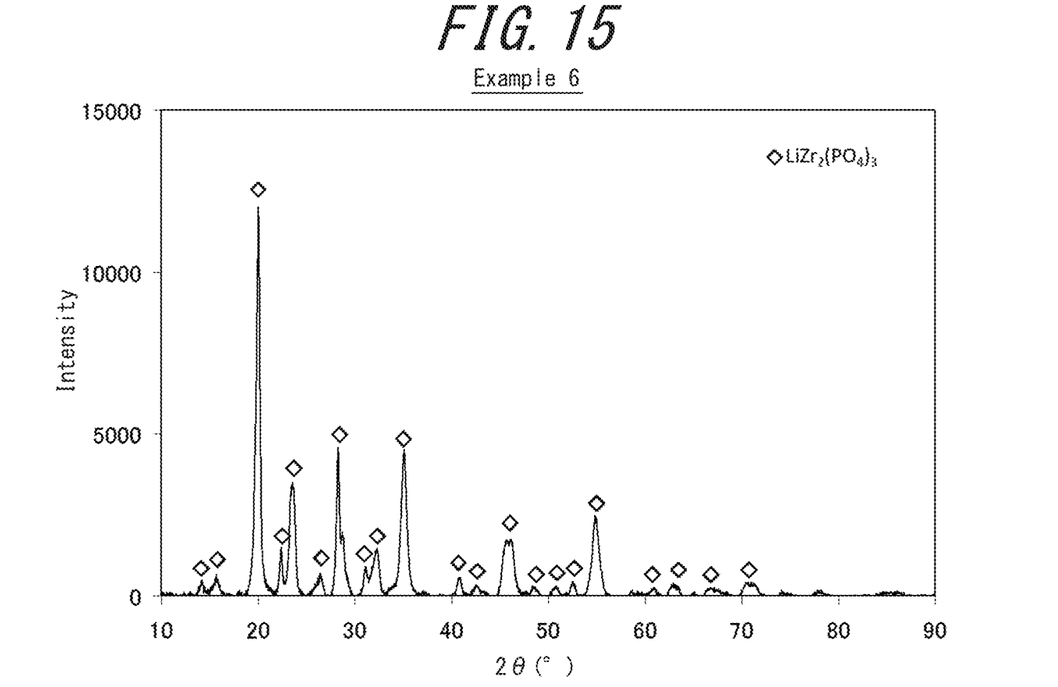
FIG. 15 illustrates an X-ray diffraction pattern of a powder in Example 6.

As illustrated in FIGS. 1 to 6, peaks tentatively judged to be for $LiTi_2(PO_4)_3$ or $LiZr_2(PO_4)_3$ and peaks for lithium pyrophosphate were mainly observed in the X-ray diffraction spectra of Examples 1 to 6. On the other hand, a comparatively large number of peaks for lithium metaphosphate ($LiPO_3$) were observed in the X-ray diffraction spectrum of Comparative Example 1 as illustrated in FIG. 7. Moreover, a comparatively large number of peaks for lithium phosphate ($Li_3PO_4$) were observed in the X-ray diffraction spectrum of Comparative Example 2 as illustrated in FIG. 8. Furthermore, peaks for zinc pyrophosphate ($Zn_2P_2O_7$) were observed in the X-ray diffraction spectrum of Comparative Example 3 as illustrated in FIG. 9.

(X-Ray Diffraction Spectrum of White Powder)

An X-ray diffractometer Ultima IV (produced by Rigaku Corporation) was used to measure an X-ray diffraction spectrum for the white powder obtained in each example or comparative example. X-ray diffraction spectra for the white powders of Examples 1 to 6 and Comparative Examples 1 to 3 are illustrated in FIGS. 10 to 18.

Figure 16:
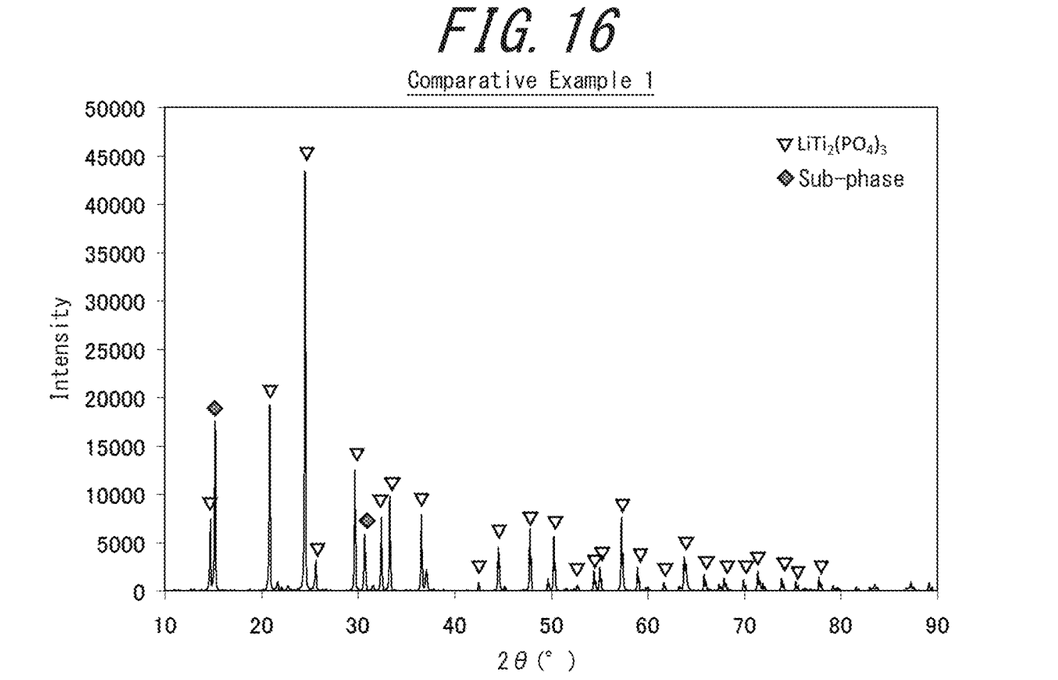
FIG. 16 illustrates an X-ray diffraction pattern of a powder in Comparative Example 1.
Figure 17:
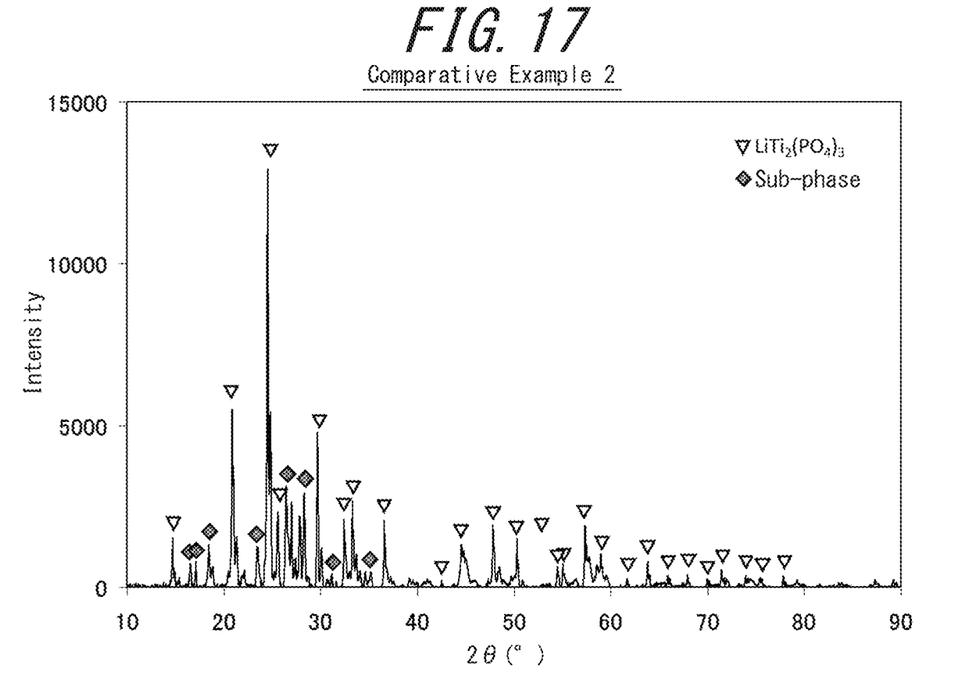
FIG. 17 illustrates an X-ray diffraction pattern of a powder in Comparative Example 2.
Figure 18:
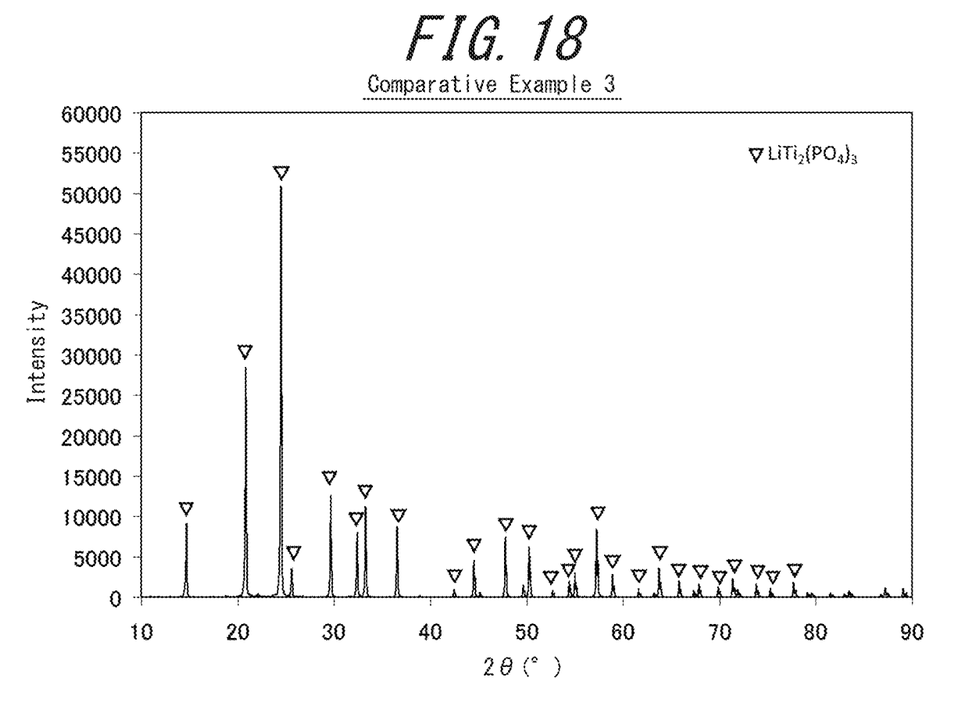
FIG. 18 illustrates an X-ray diffraction pattern of a powder in Comparative Example 3.

As illustrated in FIGS. 10 to 15, major peaks other than those tentatively judged to be for $LiTi_2(PO_4)_3$ or $LiZr_2(PO_4)_3$ were not observed in the X-ray diffraction spectra of Examples 1 to 6. On the other hand, sub-phase peaks were observed in the X-ray diffraction spectra of Comparative Examples 1 and 2 as illustrated in FIGS. 16 and 17.

(Elemental Analysis of White Powder)

A JED-2300T (produced by JEOL Ltd.) was used to perform energy-dispersive X-ray spectroscopy for the white powder obtained in each example or comparative example. As a result, it was judged that crystals of the target lithium phosphorus complex oxide had been formed in each of the examples and comparative examples.

In addition, an EA1000VX (produced by Hitachi High-Tech Science Corporation) was used to perform X-ray fluorescence analysis for the white powder obtained in each example or comparative example. Specifically, the concentration of Zn, which can be contained as an impurity in the powder, was measured. The results are shown in Table 1.

TABLE 1

| | Examples | | | | | | Comparative examples | | |
|---|---|---|---|---|---|---|---|---|---|
| | 1 | 2 | 3 | 4 | 5 | 6 | 1 | 2 | 3 |
| Zn (ppm) | 45 | 50 | 51 | 44 | 39 | 48 | 57 | 40 | 3743 |

The results in Table 1 indicate that the white powders of Examples 1 to 6 each had a Zn concentration of less than 100 ppm and contained extremely few impurities. Note that in Comparative Example 3, a large amount of Zn remained, and Zn is thought to have dissolved as an impurity.

(SEM Image of White Powder)

Figure 19:
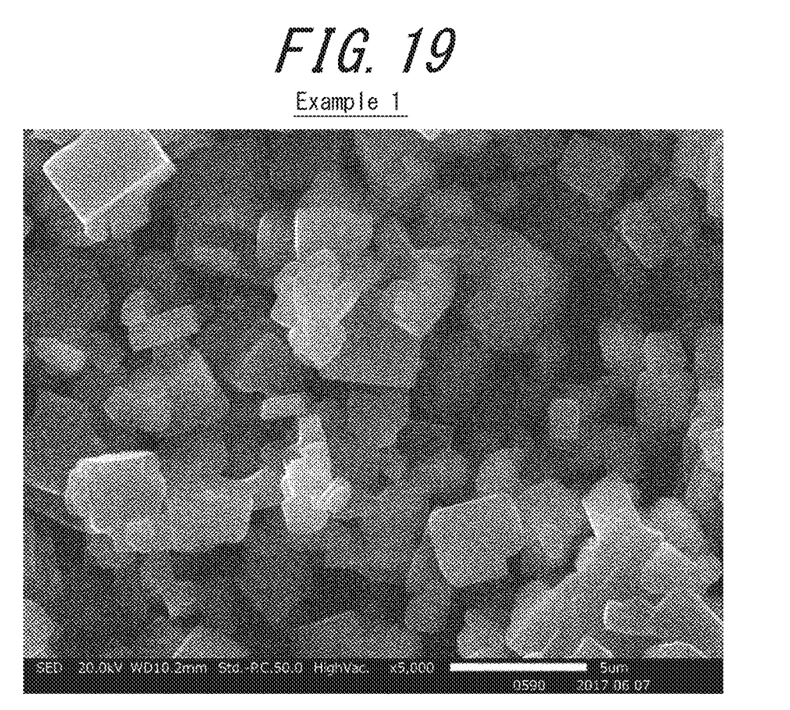
FIG. 19 illustrates an SEM image of a powder in Example 1.
Figure 20:
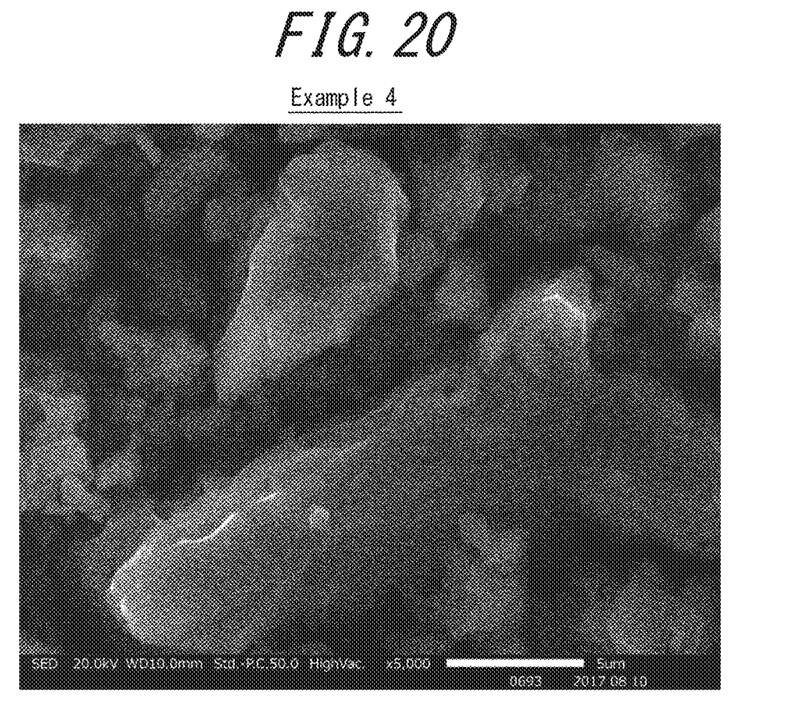
FIG. 20 illustrates an SEM image of a powder in Example 4.

An electron microscope IT-300 (produced by JEOL Ltd.) was used to obtain SEM images of the white powders of Examples 1 and 4. The results are illustrated in FIGS. 19 and 20. It can be seen from these drawings that the particle diameter of the white powder in Example 1 was smaller and more uniform than that of the white powder in Example 4. This is thought to be due to the proportion constituted by $Li_2O$ in the mixture being set comparatively high in production of the precursor glass in Example 1.

(Particle Diameter and Particle Diameter Standard Deviation of White Powder)

A particle size distribution analyzer LA-300 (produced by Horiba, Ltd.) was used to measure the particle diameter and particle diameter standard deviation of the white powder in each of Examples 1 to 3 and 5. As a result, it was possible to confirm at least that the particle diameter of each of these white powders was within a range of 0.1 μm to 10 μm and had a standard deviation of less than 2 μm.

INDUSTRIAL APPLICABILITY

According to the present disclosure, it is possible to provide a method for producing a precursor glass with which a high-quality lithium phosphorus complex oxide powder can be obtained, and also to provide this precursor glass. Moreover, according to the present disclosure, it is possible to provide a method of using the aforementioned precursor glass to produce a precursor crystallized glass with which a high-quality lithium phosphorus complex oxide powder can be obtained. Furthermore, according to the present disclosure, it is possible to provide a method of using the aforementioned precursor crystallized glass to produce a high-quality lithium phosphorus complex oxide powder, and also to provide this lithium phosphorus complex oxide powder.

The invention claimed is:

1. A method of producing a precursor glass of a lithium phosphorus complex oxide expressed by $Li_{1+x}M^{III}_xM^{IV}_{2-x}(PO_4)_3$, where $0 \leq x \leq 1$, $M^{III}$ represents an element selected from Al, Sc, Cr, Fe, Ga, and In, and $M^{IV}$ represents an element selected from Si, Ti, and Zr, the method comprising melting a constitutive material containing the elements of the lithium phosphorus complex oxide, together with an additional material containing lithium and phosphorus to obtain a precursor glass consisting of, by molar ratio:
   more than $1+x+y$ and less than $1+x+3y$ of $Li_2O$;
   not less than $0.9x$ and not more than $1.1x$ of $M^{III}_2O_3$;
   not less than $4-2.2x$ and not more than $4-1.8x$ of $M^{IV}O_2$; and
   $3+y$ of $P_2O_5$,
   where $0 \leq x \leq 1$, and $1 \leq y \leq 5$,
   wherein the constitutive material satisfies a molar ratio of $Li:M^{III}: M^{IV}:P=1+x:x:2-x:3$, and
   wherein a molar ratio of lithium to phosphorus in the additional material is more than 1 and less than 3.

2. The method of producing a precursor glass according to claim 1, wherein $Li_2O$ constitutes a proportion of 30 mol % or more in the precursor glass.

3. A method of producing a precursor crystallized glass of a lithium phosphorus complex oxide expressed by $Li_{1+x}M^{III}_xM^{IV}_{2-x}(PO_4)_3$, where $0 \leq x \leq 1$, represents an element selected from Al, Sc, Cr, Fe, Ga, and In, and $M^{IV}$ represents an element selected from Si, Ti, and Zr, the method comprising heating a precursor glass produced by the method according to claim 1 and precipitating crystals of a lithium phosphorus complex oxide and crystals of lithium pyrophosphate.

4. A method of producing a powder of a lithium phosphorus complex oxide expressed by $Li_{1+x}M^{III}_xM^{IV}_{2-x}(PO_4)_3$, where $0 \leq x \leq 1$, $M^{III}$ represents an element selected from Al, Sc, Cr, Fe, Ga, and In, and $M^{IV}$ represents an element selected from Si, Ti, and Zr, the method comprising acid treating a precursor crystallized glass produced by the method according to claim 3 to elute lithium pyrophosphate.

5. A precursor glass of a lithium phosphorus complex oxide, consisting of, by molar ratio:
more than $1+x+y$ and less than $1+x+3y$ of $Li_2O$;
not less than $0.9x$ and not more than $1.1x$ of $M^{III}_2O_3$;
not less than $4-2.2x$ and not more than $4-1.8x$ of $M^{IV}O_2$; and
$3+y$ of $P_2O_5$,
where $0 \leq x \leq 1$, $1 \leq y \leq 5$, $M^{III}$ represents an element selected from Al, Sc, Cr, Fe, Ga, and In, and $M^{IV}$ represents an element selected from Si, Ti, and Zr.

6. A powder of a lithium phosphorus complex oxide consisting of $$Li_{1-x}M^{III}_xM^{IV}_{2-x}(PO_4)_3$$

where $0 \leq x \leq 1$, $M^{III}$ represents an element selected from Al, Sc, Cr, Fe, Ga, and In, and $M^{IV}$ represents an element selected from Si, Ti, and Zr, and having a concentration of Zn as an impurity of less than 100 ppm.

7. A method of producing a precursor crystallized glass of a lithium phosphorus complex oxide expressed by $Li_{1+x}M^{III}_xM^{IV}_{2-x}(PO_4)_3$, where $0 \leq x \leq 1$, $M^{III}$ represents an element selected from Al, Sc, Cr, Fe, Ga, and In, and $M^{IV}$ represents an element selected from Si, Ti, and Zr, the method comprising heating a precursor glass produced by the method according to claim 2 and precipitating crystals of a lithium phosphorus complex oxide and crystals of lithium pyrophosphate.

* * * * *